May 16, 1944.   O. H. BANKER   2,348,716
CHANGE-SPEED GEARING FOR AIRCRAFT PROPELLERS
Filed May 15, 1941   3 Sheets-Sheet 3

Inventor:
Oscar H. Banker

Patented May 16, 1944

2,348,716

UNITED STATES PATENT OFFICE 2,348,716

CHANGE-SPEED GEARING FOR AIRCRAFT PROPELLERS

Oscar H. Banker, Evanston, Ill., assignor to New Products Corporation, Chicago, Ill., a corporation of Delaware Application May 15, 1941, Serial No. 393,571

15 Claims. (Cl. 74—260)

This invention relates to change-speed gearing and particularly to such that is adapted for use between the engine and propeller of engine-driven aircraft.

The general object of the present invention is the provision of a novel and effective change-speed transmission sufficiently light in weight and inexpensive to adapt the same for use upon small aircraft, between the engine and propeller. By employing such a transmission in which there is a speed reduction and torque multiplying power train, a propeller of fixed pitch sufficient in amount to efficiently absorb the engine power developed at the desired part-load speed while the craft is cruising, can be driven by a comparatively small engine at a speed enabling rapid take-off, climb and acceleration. Thus the small craft with a fixed pitch propeller can be practically equipped to take-off with short runs and to obtain rapid ascent without sacrificing operating efficiency while cruising, and to this extent approach the performance of the expensive variable pitch propeller installations upon the heavier more costly craft.

A more specific object of the invention is the provision of a compact change-speed unit including an over-running speed reduction power train normally disposed between a drive shaft and a propeller shaft, a higher ratio two-way-drive power train adapted to bridge the speed reduction train, and clutch means operably accessible to an operater stationed adjacently to the propeller shaft for establishing the higher ratio train whereby the propeller shaft can be rotated for cranking an engine connected with the drive shaft.

Another object is the provision of a new change-speed planetary gearing providing an overrunning speed reduction drive through its gears between a drive shaft and a hollow propeller shaft, a clutch for directly connecting these shafts, and a control extending inwardly through the propeller shaft for actuating the clutch.

Another object is the provision of a transmission according to the next preceding object, wherein the clutch control is manually operable, and wherein speed responsive means is also disposed in actuative relation with said control.

A further object of the invention is the provision of an aircraft change-speed gearing in which there is an overruning jaw clutch of which toothed components are pressable in ratcheting relation while a drive shaft is slowed to synchronism with a driven shaft and to mesh said teeth for connecting the shafts in direct driving relation the instant of such synchronization.

A further object is the provision of an improved casing and propeller shaft arrangement in which the casing is attachable to an end of an engine and the propeller shaft extends axially through the casing where it is journalled in a wall spaced from the engine and also in a bearing associated with the engine crankshaft.

A further object is the provision in a multi-speed aircraft transmission unit of a low speed ratio train adapted to remain mobilized during operation of a higher ratio train between an engine and its propeller, and clutch means disengageable to disrupt the higher ratio train whereby operation of the lower ratio train in lieu of the higher ratio train is obtainable at will.

A still further object is the provision of an aircraft transmission gearing embodying a jaw clutch in an environment lending to its ease of installation and to its accessibility for operation by control means for meshing and demeshing the same.

These and other desirable objects inherent in and encompassed by the invention will become apparent from the ensuing description and claims together with the drawings, wherein:

Each embodiment herein disclosed has two power trains of different speed ratio, the lower ratio train incurring speed reduction through planetary gearing and the higher ratio train incurring a direct drive connection between drive and driven members.

Figures 1, 2:
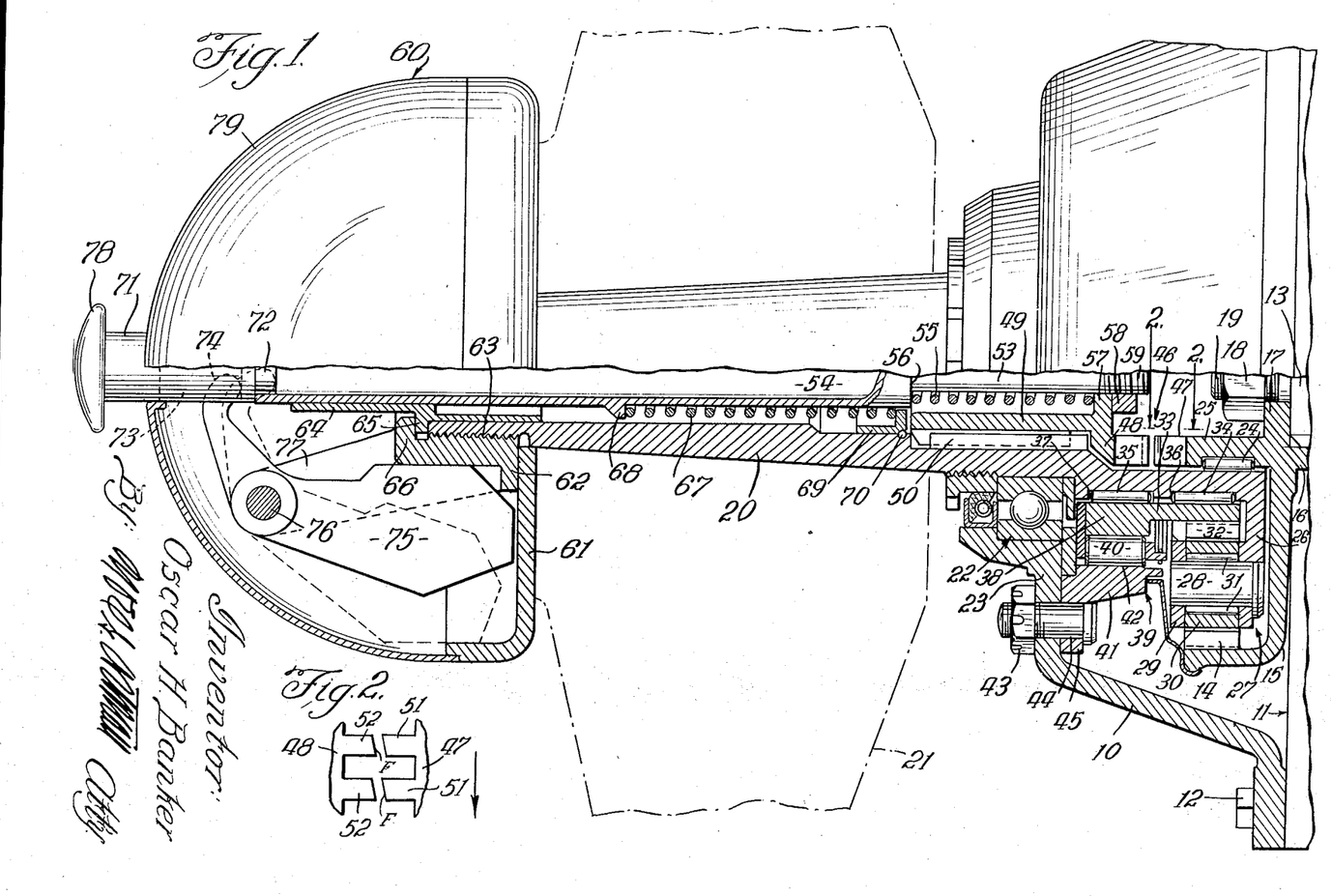
Fig. 1 is a side elevational view partly in section of a transmission apparatus embodying a preferred form of the invention, together with a propeller member to be driven thereby.
Fig. 2 is a fragmentary sectional view taken on the line 2—2 of Fig. 1 and illustrating bevelled end faces of teeth upon the counterparts of an overrunning jaw clutch employed in the apparatus.

Referring now to Figs. 1 and 2, the form of the transmission apparatus shown in these figures will be seen to comprise a gear casing 10 securable to the front end of an engine 11 by means of bolts 12. A crankshaft 13 of the engine 11 serves as the drive shaft for the apparatus. A ring gear 14 is connected to the drive shaft 13 through a web portion 15 which has a backwardly directed internally splined hub portion 16 disposed upon a splined section of the shaft 13. A radial flange 17 upon the web 15 abuts against an end face upon the shaft 13 where it is held by means of a nut 18 turned upon a reduced and threaded end section 19 of said shaft.

The driven shaft 20 of the apparatus is in the form of a propeller shaft, it having a conical outer periphery to facilitate the fixing thereon of a propeller 21 of which only the hub portion is shown, in dot-dash lines. Said propeller shaft is hollow and is arranged coaxially with the drive shaft 13. Journalling for the propeller shaft consists of a ballbearing unit 22 mounted in the front wall 23 of the casing 10 and a set of needle bearings 24 confined within a race therefore circumscribing a cylindrical flange 25 extending forwardly from the gear hub portion 16.

The back end of the propeller shaft 20 is connected with, and in this instance is integral with, a web portion 26 of a planetary gear carrier 27. A plurality of planet gear shafts 28 are carried non-rotatively in the carrier web 26 and in a forwardly spaced ring 29 secured to the web 26 by means of the usual studs (not shown) extending between said web and said ring at circumferentially spaced intervals between the planet gear shafts 28.

Planet gears 30 are respectively journalled upon the shafts 28 by means of sets of needle bearings 31 and mutually mesh with the ring gear 14 and a sun gear 32. Said sun gear has an integral sleeve portion 33 journalled upon sets of needle bearings 34 and 35 which are adapted to roll circumferentially about the propeller shaft in respective recessed races 36 and 37 circumscribing the inner end portion of said shaft. The forward end of the sleeve 33 is shaped to effect a plurality of circumferentially spaced cam members (not shown) of a form well-known in the art whereby this end effects an actuator member 38 comprising a part of an overrunning holding device 39 which also comprises a plurality of rollers 40 and a ring 41 having an inner cylindrical periphery 42 against which said rollers are adapted to be wedged by said cam members to prevent clockwise rotation of the sleeve 33 and of the sun gear 32, as viewed from the front or from the left in Fig. 1. A series of bolts 43 extend through the front wall of the casing 10 and through apertures 44 in a flange 45 of the holding device ring 41 to prevent rotation of said ring.

The present embodiment, as explained above, has two power trains through which the propeller shaft 20 is alternatively drivable from the engine 11. Of these trains the speed-reduction and torque multiplying train includes the planetary gearing unit just described and the overrunning device 39 which in the present invention embodiment serves as a one-way brake. The other power train includes an overrunning jaw clutch 46 which consists of a toothed driving counterpart 47 integral with the flange 25 and a toothed driven counterpart 48 upon the forward end of a sleeve 49 splined to an internal section of the propeller shaft as indicated at 50. Thus it will be seen that when the teeth 51 and 52 of the clutch counterparts 47 and 48 are meshed, the propeller shaft 20 will be directly connected for rotation with the shaft 13.

The sleeve 49 together with a reduced end portion 53 of a shifter rod 54, axially slidable within the propeller shaft 20, effect a chamber for a helical expansion spring 55. This spring reacts between a shoulder 56 upon the rod 54 and a flange 57 upon the sleeve 49, and when the rod 54 is in its forward position illustrated in Fig. 1 the spring 55 will retain the flange 57 in abutting relation with a stop member 58 screwed onto a threaded end section 59 of said rod.

Speed responsive means, responsive to the speed of the propeller shaft 20, for controlling the engagement and disengagement of the clutch 46 is contained within a housing 60 carried upon the forward end of the propeller shaft. The back wall of this housing consists of a disk-like member 61 which may be secured to the propeller hub and which, together with said hub, is pressed axially backwardly onto the propeller shaft by a threaded member 62 turned on to a threaded section 63 of the said propeller shaft. Thus the plate 61 in addition to providing a part of the housing for the speed responsive mechanism may also serve as a part of the means for securing the propeller upon the shaft 20.

A bearing sleeve 64 is also associated with the forward end of the propeller shaft 20 and has an outwardly projecting flange 65 which is engageable between a flange 66 of the threaded member 62 and the end of the propeller shaft. Said sleeve 64 reciprocally supports a section of the shifter rod 54 which is hollow throughout its portion of greater diameter as illustrated in Fig. 1. This rod is normally held forwardly by means of a helical spring 67 which reacts between a flange 68 thereon and a stop member 69 held in place within the propeller shaft by a snap ring 70. A bolt 71 having a reduced end section 72 inserted in the forward end of the rod 54 is provided with a diametric slot 73 which receives heel portions 74 of a pair of inertia weights 75 of which one is shown in Fig. 1. Each of the weights 75 is pivoted as at 76 upon fulcrum support arms 77 integral with the threaded member 62. Said weights are pivotal between oscillative limits respectively illustrated by the full line and the dotted line positions thereof in Fig. 1. When the propeller shaft 20 is at rest or rotating at slow speeds the spring 67 will exert sufficient force upon the flange 68 of the rod 54 and therefore upon the heel portions 74 of the weights 75 for maintaining these weights radially inwardly in the full line position.

In the operation of this form of the invention, assuming the engine 11 to be rotating at idling speed, the propeller shaft 20 and the propeller carried thereby will be caused to rotate at a somewhat slower idling speed. The low speed power train establishing this driving connection between the propeller shaft and the engine consists of the ring gear 14 of which the hub 16 is connected nonrotatively with the drive shaft 13 driven by the engine, the planet gears 30 and the planet carrier 27 which in the present instance is integral with the propeller shaft. Due to the resistance of the propeller to rotation, the planet carrier 27 connected therewith resists rotation so that as the ring gear 14 is rotated counterclockwise, as viewed from the front, the planet pinions 30 react against the sun gear 32 as a fulcrum therefor, tending to rotate this sun gear, the sleeve 33 and the overrunning brake actuator member 38 clockwise. However, as above explained, the cams (not shown) upon the actuator member 38 will then cause the rollers 40 to be wedged against the inner periphery of the ring 41 and thus constrain these parts against such clockwise rotation. Consequently the planet gears 30 will be caused to roll about the toothed periphery of the sun gear while advancing the carrier 27 and the propeller shaft 20 connected therewith at reduced speed with respect to the drive shaft. This low speed power train remains in driving relation between the propeller shaft 20 and the engine when the latter is speeded up for driving the propeller at takeoff speed. However, upon the attainment of this speed or of any other selected speed, the inertia weights 75 will develop sufficient centrifugal force to cause them to pivot outwardly to the dotted-line position while their heel portions 74 shift the rod 54 axially inwardly against the force of the spring 67. Pursuant to this inward movement of the rod 54, the shoulder 56 will advance the spring 55 and hence the clutch counterpart 48 inwardly to place the teeth 52 thereon in ratcheting relation with the teeth 51 on the clutch counterpart 47, it being understood that at this time the counterpart 47 will be rotating faster than the counterpart 48. Such ratcheting is facilitated by the bevelled end faces F upon the clutch teeth as shown in Fig. 2. The force with which these counterparts are pressed together is determined by the strength of the spring 55 since inward movement of the rod 54 is limited to such as that incurred by movement of the inertia weights 75 into the dotted line position where they abut against the housing wall. This movement of the rod 54, however, will be sufficient for compressing the spring 55 enough that the latter, upon synchronization of the clutch counterparts 47 and 48, will slide the counterpart 48 into mesh with the counterpart 47.

After completing the take-off and climb to the desired altitude the operator may initiate an automatic shift into the direct drive power train by momentarily closing the engine throttle to cause deceleration, due to engine compression, of the shaft 13 and hence of the clutch counterpart 47 with respect to the clutch counterpart 48 as permitted by the overrunning device 39. That is, the overrunning device 39 permits the sun gear 32 and the carrier 27 with which the propeller shaft 20 is connected to overrun the ring gear 14 with which the engine crankshaft is connected. Upon deceleration of the engine sufficiently for the clutch counterpart 47 to synchronize with the counterpart 48 the spring 55 will shift said counterpart 48 rearwardly for meshing the teeth 51 and 52 and thus establishing the direct drive connection or power train between the engine and the propeller shaft. This driving connection will be established for operating the craft under cruising conditions when it will be desirable to drive the engine at lower speed, and, inasmuch as the low ratio train is available to enable the engine to develop enough power for driving a comparatively large pitch propeller fast enough for take-off, the craft can be equipped with a propeller having a pitch adequate for efficiently absorbing the power developed by the engine when driven at the slower speed while the craft is cruising.

While cruising, the operator may wish to re-establish the first speed train to obtain more power for meeting an emergency such as that requiring a rapid ascent. A shift back into first or low speed can be accomplished by slowing down the engine to a predetermined speed (safely above stalling speed) at which the centrifugal force of the weights 75 is so diminished that upon removing the load from the clutch by momentarily closing the engine throttle the spring 67 will disengage this clutch.

In cranking the engine by manually rotating the propeller shaft, the operator may bridge the low ratio free-wheeling power train by engaging the clutch 46. This is accomplished by pressing inwardly with the palm of his hand against a button 78 upon the outer end of the bolt 71 to shift the rod 54, the spring 55 and the clutch counterpart 48 inwardly while compressing the spring 67. As soon as the manually applied cranking couple is released, the spring 67 will operate to disengage the clutch 46 before the inertia weights 75 are driven at a speed sufficient to enable them to hold said spring 67 compressed, wherefore, immediately after the engine starts, the apparatus will be connected in the low speed connection preparatory to the take-off.

Separation of the inertia weights 75 from the transmission device proper and into the housing 60, makes it possible to construct the transmission gearing and its housing 10 with greater compactness and this in turn makes it possible to minimize the axial distance between the propeller and the engine whereby a rigid support for the propeller is more readily obtained. Furthermore, the housing 60 can be formed with a dome-shaped cover plate as the plate at 79 so that this casing will improve the streamline contour of the craft.

Figures 3, 4:
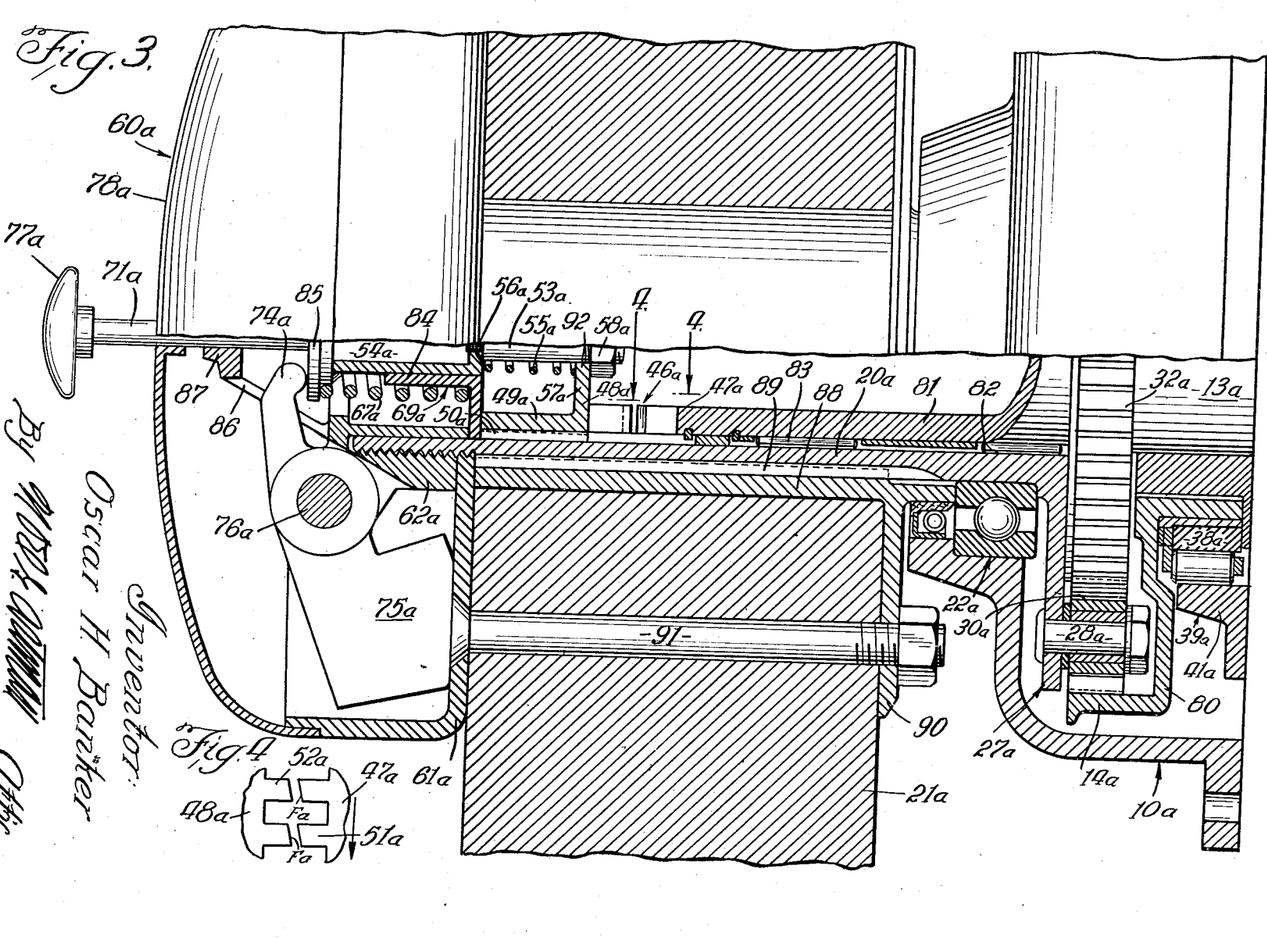
Fig. 3 is a view similar to Fig. 1 but illustrating a modified form of the invention.
Fig. 4 is a fragmentary sectional view taken on the line 4—4 in Fig. 3, illustrating the teeth upon the counterparts of an overrunning jaw clutch used in this second form of the invention.

The general arrangement and operation of the change-speed apparatus shown in Figs. 3 and 4 is similar to that of the above described apparatus, this second form also having two power trains of which one provides a speed reduction connection through planetary gearing and the other constitutes a direct drive connection between the engine and the propeller shaft. Insofar as parts in this second embodiment of the invention correspond to parts in the first described embodiment, they will be designated by the same reference character with an *a* added.

In this second embodiment the sun gear 32a of a planetary gear unit is drivingly connected with the crankshaft 13a of the engine whereas the ring gear 14a of such unit is connected by an annular web 80 with the actuator member 38a of an overrunning device 39a. The reaction ring 41a of this overrunning device is suitably fixed to the engine by any standard means such as bolts (not shown). As in the first embodiment the planet carrier 27a is drivingly connected with and in this instance is integral with the propeller shaft 20a, and a ball bearing unit 22a serves as a journal for this shaft in the front wall of the casing 10a.

A sleeve-like extension 81, which is drivingly connected with (and in this instance integral with) the sun gear 32a, is journalled within the propeller shaft 20a upon sets of needle bearings 82 and 83 and has, as a part thereof, a toothed counterpart 47a of an overrunning jaw clutch 46a. The driven component 48a of the clutch 46a is integral with a spring-pressed sleeve 49a connected by splines 50a to the inner periphery of the propeller shaft wherefore this shaft will be directly connected with the engine-driven shaft 13a through the extension 81 when the clutch 46a is engaged. A nut 58a turned upon the threaded inner end portion 53a of a shifter rod 54a serves as a stop member, limiting axial movement of the clutch counterpart 48a inwardly under the force of a spring 55a reacting against a shoulder 56a of such rod. A stop member 69a for the inner end of the speed responsive device spring 67a abuts against the forward ends of the splines at 50a upon the inner periphery of the propeller shaft, and a sleeve portion 84 of said stop member serves as a bearing in which the hollow cylindrical portion of the rod 54a can be shifted axially. A flanged head 85 upon the front end of the rod 54a engages the opposite end of the spring 67a.

The threaded holder member 62a for the inertia weights 75a in this instance is additionally provided with a bearing bracket 86 having a bearing 87 disposed coaxially with the propeller shaft 20a and for supporting a manually actuatable bolt 71a. As in the first embodiment, a disk-like portion 61a which forms a part of a housing 60a for the speed-responsive mechanism is instrumental in securing a propeller 21a in place upon the propeller shaft. The propeller hub is provided with an inner sleeve 88 splined at 89 to the propeller shaft 20a and having a circular flange 90 upon its back end, suitably apertured for receiving machine bolts 91 which are passed through apertures in the housing disk 61 and in the propeller hub.

While the engine is rotating at low speeds the propeller shaft 20a will be driven through the low speed ratio power train which includes the sun gear 32a, planet gears 30a which are caused to roll about the toothed periphery of the ring gear 14a, the carrier 27a which is advanced with the thus rolling planet gears, and said propeller shaft. Backward rotation of the ring gear 14a by the planet gears reacting thereon during operation of the first speed train is prevented by braking action of the overrunning unit 39a. During operation of the first speed power train while the engine is operating at idling speed the propeller shaft 20a will of course be driven at a somewhat slower idling speed which permits the spring 67a to hold the rod 54a forwardly in the position shown in Fig. 3 against the slight force exerted by the weights 75a tending to move the rod backwardly. Consequently the teeth of the overrunning jaw clutch counterparts 47a and 48a will be out of engagement. When, however, the propeller shaft is driven sufficiently fast for propelling the craft for take-off or under normal cruising conditions, the weights 75a will develop sufficient centrifugal force to cause them to pivot about their shafts 76a whereby their heel portions 74a will shift the rod 54a backwardly while compressing the spring 67a. Meanwhile the spring 55a will first be moved to bring the bevelled end faces Fa upon the clutch teeth 52a into ratcheting engagement with the corresponding end faces of the clutch teeth 51a and thereafter said spring 55a will be compressed while the reduced section 53a of said rod 54a projects backwardly through the opening 92 in the flange 57a. Following the take-off and climb to the desired altitude the operator may shift from the low speed train into the higher ratio direct train by closing the throttle of the engine and thus causing the shaft 13a to decelerate with respect to the propeller shaft 20a as permitted by the overrunning unit 39a, to bring the clutch counterpart 47a into synchronism with the clutch counterpart 48a whereupon the then compressed spring 55a will force the clutch teeth 52a axially into mesh with the teeth 51a. At this time the direct drive connection will be established while overrunning of the unit 39a continues.

It should be noted that the spring 67a is the stronger of the two springs 67a and 55a and provides the substantial part of the yielding opposition to centrifugal force of the inertia weights 75a. On the other hand, the spring 55a is made with only sufficient strength to force the clutch teeth 52a into mesh with the teeth 51a when the clutch counterparts are synchronized. Hence the spring 55a will press the clutch teeth only lightly together during ratcheting so as to avoid noise and injury to the teeth.

While cruising, a shift to the first speed connection is brought about by the same maneuver as that explained above, namely, by decreasing the speed of the engine and propeller until the spring 67a can predominate over the centrifugal force of the weights 75a, and while this condition obtains allowing the engine throttle to be closed whereby the clutch 46a will be substantially free of load so the spring 67a can then slide the shifter rod 54a forwardly to the position shown in Fig. 3 incident to drawing the nut 58a forwardly against the flange 57a and moving the clutch counterpart 48a out of mesh with the counterpart 47a. This disconnects the direct drive train so that the drive may be taken up through the low speed train by again accelerating the engine.

It will be observed that the direct drive train can be established for cranking the engine by means of the propeller by manually pressing inwardly upon the button 71a to move the shifter rod 54a and the clutch counterpart 48a rearwardly against the force of the spring 67a to engage the clutch 46a. While the clutch 46a is thus engaged the propeller can be spun for cranking the engine and when the starting torque is released from the propeller the spring 67a will disengage the clutch 46a wherefore the propeller shaft 20a will be drivingly connected with the engine through the first speed power train preparatory to take-off.

Figures 5, 6, 7:
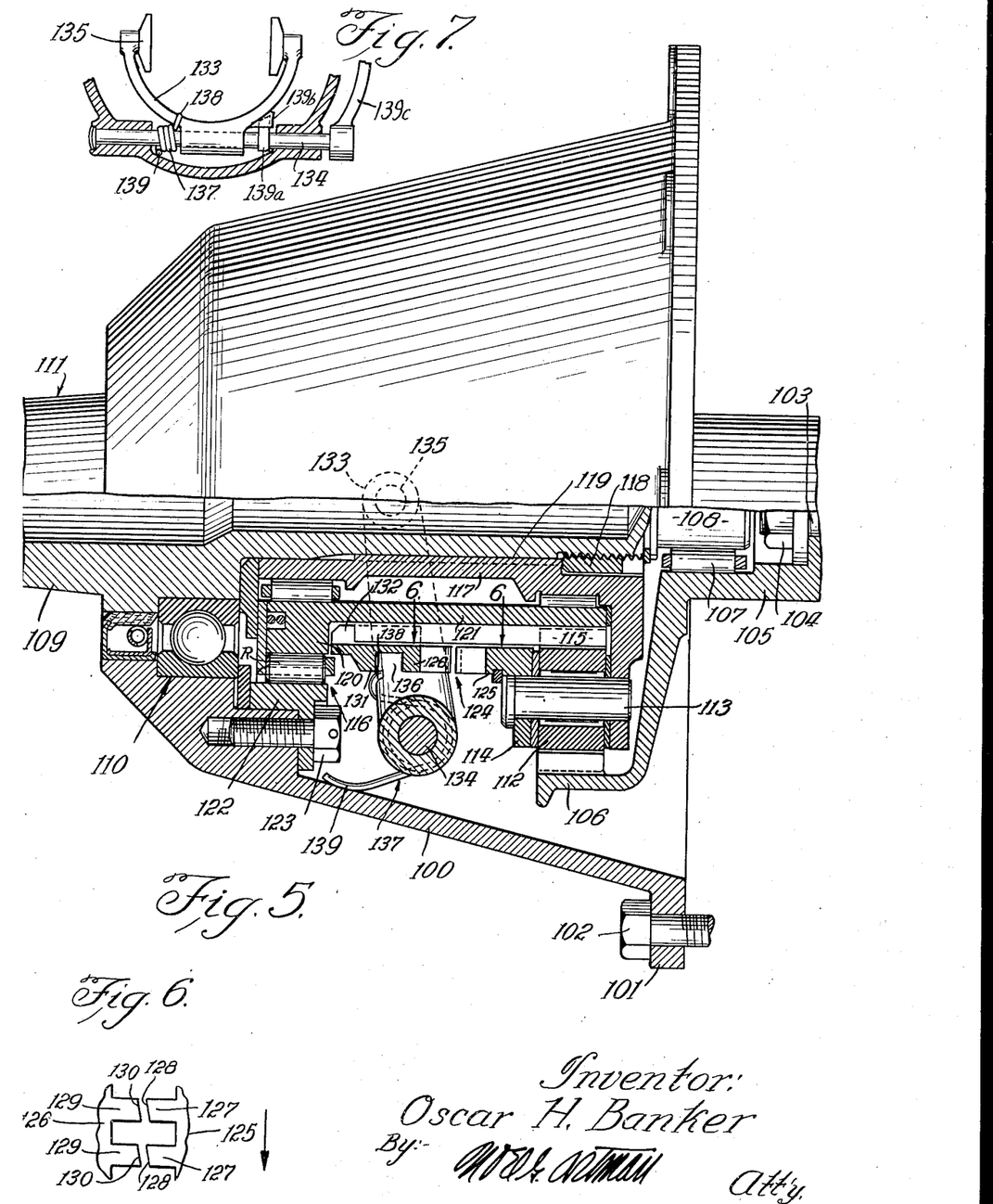
Fig. 5 is also a view similar to Fig. 1 and illustrating a third embodiment of the invention.
Fig. 6 is a fragmentary sectional view taken on the line 6—6 in Fig. 5, showing the teeth of an overrunning jaw clutch in this third embodiment of the invention.
Fig. 7 is a fragmentary sectional view looking backwardly in the transmission shown in Fig. 5 and illustrating the shifter fork and control therefor.

The third form of speed reduction gearing, shown in Figs. 5 and 6, is also a two speed arrangement, the first or low speed connection being obtained through planetary gearing as in the above described embodiments and the higher speed being a direct drive connection in which the drive shaft and the propeller shaft are caused to rotate at the same speed. In this particular form of the invention, an overrunning jaw clutch similar to those above described and connectible for establishing the direct drive connection is associated with manually operable means, although it will be understood that an auxiliary speed responsive mechanism might be provided for actuating the shifter means which controls the engagement and disengagement of this clutch.

Referring now to Fig. 5 this transmission is shown enclosed in a casing 100 having about its back end a flange 101 in which there are apertures for bolts 102 which serve to hold the apparatus upon the front end of an engine block (not shown) and in coaxial relation with an engine crankshaft 103 which serves as the transmission drive shaft. Only a reduced threaded end section of the shaft 103 is shown, there being a nut 104 turned upon this end section of the crankshaft to retain the hub 105 of a ring gear 106 in non-rotative relation with said shaft.

Said hub 105 is hollow to facilitate the journalling therein, upon needle bearings 107, of a reduced end portion 108 upon the back end of a hollow propeller shaft 109. A central section of said propeller shaft is journalled in the front wall of the casing 100 upon a ballbearing unit 110. The outer periphery 111 at the forward portion of said propeller shaft is conical to facilitate attachment thereto of a propeller (not shown).

The low speed power train includes said ring gear 106, planet gears 112 meshed with said ring gear and journalled upon respective shafts 113 in a planet gear carrier 114, a sun gear 115 together with an overrunning unit 116 which prevents backward rotation of the sun gear during operation of said low gear speed train, and a sleeve member 117 which is a part of the back plate of the carrier 114 and which is splined to the back end of the propeller shaft at 119. A nut 118 holds the splined parts 109 and 117 against axial separation. An actuator member 120 for the overrunning unit 116 is integral with the forward end of a sleeve shaft 121 upon which the sun gear is formed. Clutch rollers R are adapted to be wedged by the actuator member 120 against the inner cylindrical periphery of a ring 122 which is part of the unit 116. Said ring is fixed to the casing 100 by means of bolts 123. The cams (not shown) upon the actuator 120 are adapted to wedge the rollers R against the ring 122 only when the sun gear 115 tends to rotate clockwise as viewed from the front of the device but fail to so wedge the rollers when the sun gear tends to rotate in the opposite direction whereby the sun gear cannot rotate clockwise but is free to rotate counter-clockwise. Thus the overrunning unit 116 is adapted to prevent backward or clockwise rotation of the sun gear 115 during operation of the first speed train.

Effecting a shift from the first speed train to the direct drive train involves the engagement of an overrunning jaw clutch 124 including counterparts 125 and 126 respectively connected with the planet gear carrier 114 and with the sun gear 115. The counterpart 125 is integral with the forward side of the carrier 114 and comprises a ring of teeth 127 having bevelled end faces 128. The counterpart 126 comprises a ring of teeth 129 on which there are bevelled end faces 130, said counterpart 126 being integral with a shifter ring 131 having internal splines 132 for non-rotatively connecting the same with the exteriorly splined sleeve shaft 121. Axial movement of the clutch counterpart 126 is effected by means of a shifter fork 133 pivotally mounted upon a cross shaft 134 and having within the ends of its legs pivotal studs or shoes 135 which project into a groove 136 circumscribing the ring 131. A spring 137 is wrapped about the hub of the shaft 134 and has one end 138 hooked about a leg of the shifter fork and an opposite end 139 bearing against a wall of the casing. This spring 137 therefore constantly urges the shifter fork to pivot clockwise and thus be operative through the studs 135 for shifting the ring 131 rearwardly for pressing the end faces 130 of the teeth 129 against the end faces 128 of the teeth 127 for meshing such teeth, depending upon whether the clutch counterparts are synchronized with the teeth relatively circumferentially disposed for meshing. However, a boss 139a fixed to the shaft 134 is disposable in abutting relation with a projection 139b on the fork to hold the clutch disengaged. There is also manually controlled means including an arm 139c fixed to the shaft 134 and a linkage (not shown) reaching from said arm into convenient reach of the operator, and by means of which he can forcibly move and retain the shifter fork in the position shown or release said fork to place the clutch 124 under control of the spring 137.

For take-off, climb and fast acceleration the propeller shaft 109 will be driven through the low speed power train above described, and during operation of this train while the clutch counterpart 125 is rotating counter-clockwise relatively to the counterpart 126 which will be stationary, the operator may manipulate the aforesaid manual control means for releasing the shifter fork 133 and placing it under control of the spring 137 whereby this spring will place the clutch teeth 129 in ratcheting relation with the clutch teeth 127. Thereafter when the operator desires to shift into the direct drive connection he can do so by closing the engine throttle and thus causing the engine crankshaft and the ring gear 106 connected therewith to decelerate with respect to the propeller shaft 109. During this deceleration of the ring gear 106 relatively to the propeller shaft 109 and hence relatively to the sleeve 117 and the planet carrier 114 connected with said sleeve, the sun gear 115 and the clutch counterpart 126 connected therewith will be accelerated counterclockwise. Eventually the clutch counterpart will attain the same speed as the carrier 114 and the counterpart 125 connected therewith whereupon the spring 137 will cause meshing of the clutch counterparts and establishment of the direct drive power train. When the clutch is thus meshed the sun gear 115 will be held against rotation relatively to the planet carrier 114 whereby the planetary gearing unit will have all of its parts locked against relative rotation so that the carrier which is non-rotatively connected with the propeller shaft 109 will be caused to rotate at the same speed as the ring gear 106 which is connected non-rotatively with the crankshaft. Meanwhile the sun gear and the sleeve 121 will rotate counter-clockwise as permitted by the overrunning unit 116.

If at any time the operator wishes to establish the low speed power train between the engine and propeller shaft as when desiring more power to meet an emergency, he will manipulate the aforesaid manually controlled means for rotating the cross shaft 134 and the shifter fork 133 counter-clockwise to disengage the clutch 124 whereupon by accelerating the engine the drive can be taken up through the low speed train which remained mobilized during operation of the direct drive connection. The apparatus is therefore operable both quickly and positively to avail the emergency power train.

While I have herein shown and described a limited number of embodiments which are thought adequate for clearly disclosing the invention, it should be understood that the invention is not limited to this specific disclosure but comprehends other constructions, arrangements of parts and details falling within the spirit thereof.

I claim:

1. In an engine-driven aircraft employing a change-speed transmission between its engine and a propeller, said propeller having a hub, control means for said transmission extending from the transmission through the propeller hub to the opposite side of the propeller from the engine accessibly to an operator stationed at the propeller for operably interposing between the propeller and said engine a power connection of said transmission suitable in speed ratio for cranking the engine by rotating the propeller.

2. In a vehicular craft employing a propeller driven by an engine, said propeller having a hub, a change-speed transmission normally establishing an overrunning drive connection between said engine and the propeller, means operable to establish a two-way-drive connection through said transmission between said engine and the propeller and through which the propeller is effective, when rotated, for cranking the engine, and control means for said two-way-drive establishing means, and said control means extending from the transmission through the propeller hub to the opposite side of the propeller from the engine accessible to an operator stationed at the propeller for rotating the same.

3. In a vehicular craft employing a propeller driven by an engine, a change-speed transmission disposed between the engine and propeller, said propeller having a hub, said transmission comprising a power train of low speed ratio normally interposed between the engine and propeller, said power train including an overrunning holding device by virtue of which the propeller is free to rotate forwardly at a speed exceeding that at which said power train if operating would drive the same, said transmission also comprising a power transmitting connection of higher speed transmitting ratio than the normally interposed train and establishable in two-way-drive relation between the engine and propeller, control means operable to establish said higher ratio connection, and said control means extending from the transmission through the propeller hub to the opposite side of the propeller from the engine within convenient access of an operator stationed at the propeller preparatory to rotating the same for cranking the engine.

4. In a vehicular craft employing a propeller driven by an engine, a hollow propeller shaft upon which the propeller is mounted, a change-speed transmission disposed between said propeller shaft and the engine, said transmission comprising a power transmitting connection of low speed transmitting ratio normally interposed between the engine and propeller shaft, said connection including an overrunning holding device by virtue of which the propeller shaft is free to rotate forwardly at a speed exceeding that at which said connection if operating would drive the same, said transmission also comprising a power transmitting connection of higher speed transmitting ratio than the normally interposed connection and establishable in two-way-drive relation between the engine and propeller shaft, control means operable to establish said higher ratio connection and comprising actuator means extending outwardly from the transmission axially through said propeller shaft and beyond the end thereof within convenient access of an operator stationed at the propeller preparatory to rotating the same for cranking the engine.

5. Change-speed transmission apparatus comprising a planetary gear unit including coaxial gears of which one is a sun gear and the other a ring gear, a planet gear carrier and planet gears journalled on said carrier and mutually meshed with the sun and ring gears, drive and driven shafts coaxial with said coaxial gears, one of said shafts being drivingly connected with the carrier and the other of said shafts being drivingly connected with one of the coaxial gears, an overrunning holding device including a fixed part and a part rotatable only forwardly relatively to the fixed part and coaxially with said coaxial gears, said rotatable part being connected with the other of the coaxial gears to hold the same against backward rotation whereby the planet gears can react thereagainst for causing forward rotation of the carrier at reduced speed with respect to the one coaxial gear while the latter is rotated forwardly, one of said shafts being hollow, and jaw clutch means in the hollow portion of said shaft and including counterparts respectively connected with said shafts and meshable to drivingly connect said shafts independently of the planetary gear unit.

6. Change-speed transmission apparatus comprising a planetary gear unit including coaxial gears of which one is a sun gear and the other a ring gear, a planet gear carrier and planet gears journalled on said carrier and mutually meshed with the sun and ring gears, a hollow shaft drivingly connected with the carrier and journalled coaxially with the coaxial gears, a second shaft drivingly connected with one of the coaxial gears and journalled coaxially therewith, an overrunning holding device including a fixed part and a part rotatable only forwardly relatively to the fixed part and coaxially with the coaxial gears, the rotatable part being connected with the other coaxial gear to hold the same against backward rotation while the planet gears react thereagainst for causing forward rotation of the carrier and hollow shaft at reduced speed with respect to the one coaxial gear and the second shaft while the latter is rotated forwardly, and clutch means in said hollow shaft and including counterparts respectively connected with said shafts and engageable to drivingly connect said shafts independently of the planetary gear unit.

7. In a change-speed transmission employable between the propeller and engine of an engine-driven craft, a planetary gear unit including coaxial gears, a planet gear carrier and planet gears journalled on the carrier and mutually meshed with the coaxial gears, a hollow propeller shaft drivingly connected with said carrier and journalled coaxially with the coaxial gears, a drive shaft drivingly connected with one of the coaxial gears and journalled coaxially therewith, an overrunning holding device including a fixed part and a part rotatable only in one direction relatively to the fixed part and coaxially with the coaxial gears, said rotatable part being connected with the other coaxial gear to hold the same against backward rotation while the planet gears react thereagainst for effecting forward rotation of the carrier and propeller shaft at reduced speed with respect to the one coaxial gear while the latter is rotated forwardly, clutch means between said shafts and including counterparts respectively connected with said shafts and engageable to connect said shafts for rotation in unison, and actuating means for said clutch means, comprising means projecting axially outwardly through the hollow portion of the propeller shaft into a position of accessibility at an end thereof.

8. In a change-speed transmission employable between the propeller and engine of an engine-driven craft, a planetary gear unit including coaxial gears, a carrier journalled coaxially with said gears and planet gears journalled on said carrier and mutually meshed with said coaxial gears, a hollow propeller shaft disposed coaxially with and drivingly connected with the carrier, a drive shaft disposed coaxially with and drivingly connected with one of the coaxial gears, an overrunning holding device including a fixed part and a part rotatable only in one direction relatively to the fixed part and coaxially with the coaxial gears, said rotatable part being connected with the other coaxial gear to hold the same against backward rotation while the planet gears react thereagainst incident to effecting forward rotation of the carrier and propeller shaft at reduced speed relatively to the drive shaft and the one gear while the latter is rotated forwardly, clutch means between and connected with said shafts and operable for connecting said shafts for rotation in unison, speed responsive means upon and responsive to the rotational speed of the propeller shaft, and actuating means for said means extending axially outwardly through the hollow portion of the propeller shaft for operation under control of the speed responsive means.

9. The combination set forth in claim 8, and wherein said clutch means comprises toothed counterparts respectively connected with said shafts and relatively axially movable to mesh their teeth for connecting the shafts together for rotation in unison, said teeth upon each counterpart having end faces which are disposed in opposed relation with the corresponding end faces upon the teeth of the other when the teeth are demeshed, said counterparts being normally disposed with their teeth demeshed and said opposed teeth end faces being bevelled to facilitate ratcheting when they are placed in abutting relation while the drive shaft is rotating faster than the propeller shaft, and the speed responsive means being operable, when subjected to speeds above a predetermined minimum, to operate the clutch actuating means for placing the teeth in such abutting and ratcheting relation and to force the teeth into mesh upon deceleration of the drive shaft and the counterpart connected therewith to synchronism with the propeller shaft and the counterpart connected therewith.

10. In change-speed transmission apparatus for craft propelled by an engine-driven propeller, a plurality of different speed ratio power transmitting connections, a hollow propeller shaft normally connected with the engine through a lower speed transmitting ratio of said trains and including a propeller attaching section upon its outer periphery, clutch means operable to establish a higher speed transmitting ratio of said connections in driving relation between the propeller shaft and said engine, and actuating means extending axially inwardly through the hollow portion of said shaft into operating relation with said clutch.

11. The combination set forth in claim 10, and wherein the lower ratio of said connections is free-wheeling in character wherefore the said engine can decelerate relatively to the propeller shaft while said lower ratio connection remains mobilized, wherein said clutch means includes toothed counterparts respectively connected with the engine and with the propeller shaft and relatively movable axially of the propeller shaft to mesh their teeth for establishing the higher ratio connection, and wherein there is speed responsive means associated with the outer end of the propeller shaft and responsive to speeds thereof above a predetermined minimum to operate said actuating means, while the lower ratio connection is in operation, for pressing the teeth of said counterparts into ratcheting relation preparatory to meshing them upon predetermined deceleration of the engine relatively to the propeller shaft.

12. In change-speed transmission apparatus for craft propelled by an engine-driven propeller, an engine-driven drive member, a hollow propeller shaft having a propeller attaching section upon its outer periphery, a low ratio power train normally connected between said engine-driven member and the propeller shaft and being overrunning in character so the engine-driven member can decelerate relatively to the propeller shaft while said train remains mobilized, a higher ratio power train including an overrunning jaw clutch comprising counterparts respectively connected with the engine-driven member and with the propeller shaft, the counterpart connected with the propeller shaft having a splined connection therewith so such counterpart can be moved axially thereof into mesh with the other counterpart for establishing the higher ratio train in driving relation between the propeller shaft and the engine-driven member, speed responsive means comprising inertia weights upon the outer end of the propeller shaft and rotatable therewith, a rod slidable axially of and within the hollow portion of the propeller shaft and connected with said weights so the latter urge the rod inwardly of the propeller shaft with a force constituting a function of the speed of said shaft, a spring in said shaft for reacting against said rod in opposition to the weights, a second spring disposed between the rod and the axially movable clutch counterpart and operable to press said counterpart into ratcheting relation with the other counterpart when, during operation of the low ratio train, the propeller shaft attains a speed at which the weights force the rod inwardly of the propeller shaft a predetermined amount and preparatory to meshing said counterparts upon deceleration of the engine-driven member to synchronism with the propeller shaft.

13. In change-speed apparatus for drivingly connecting the crankshaft of an aircraft engine with a propeller, a casing attachable to an end of the engine and including an outer end wall disposed in spaced relation from such end of the engine when the casing is so attached, propeller shaft bearing means adjacently to the inner end of said casing for disposition coaxially with the outer end of said crankshaft, additional propeller shaft bearing means in said casing outer wall, a hollow propeller shaft extending axially through said casing where it is journalled in both of said bearing means and including a propeller attaching section projecting outwardly from the casing wall, a ring gear disposed in said casing coaxially with the propeller shaft, means upon the inner end of said gear for drivingly connecting the same with the crankshaft, a planet gear carrier journalled coaxially with the propeller shaft and comprising a web portion disposed axially inwardly of the casing with respect to the ring gear, means non-rotatively connecting said carrier web portion with the propeller shaft, a sun gear axially outwardly of the carrier web portion, planet gears on said carrier and mutually meshed with said sun and ring gears, a sleeve shaft rotatable with the sun gear coaxially about the propeller shaft and projecting axially outwardly from the sun gear, an overrunning brake device disposed between an outer end portion of the sleeve shaft and a portion of said casing and operable while reacting against the casing to hold the sleeve shaft and sun gear against backward rotation during forward rotation of the ring gear with the crankshaft whereby the planet gears can react against the sun gear for driving the carrier and the propeller shaft connected therewith forwardly at reduced speed with respect to the crankshaft, an overrunning jaw clutch comprising toothed counterparts rotatable coaxially of the propeller shaft and disposed therein, one of the counterparts being connected for rotation with the propeller shaft and the other being connectible with the crankshaft whereby during the aforesaid rotation of the propeller shaft at reduced speed said other counterpart is rotated at greater speed than the one counterpart, said other counterpart being deceleratable with the crankshaft relatively to the one counterpart and the propeller shaft incident to overrunning said overruning brake, and speed responsive means operable upon attainment of a predetermined speed by said propeller shaft to urge said clutch counterparts into mesh and to thus effect such meshing upon deceleration of said other counterpart to synchronism with the one counterpart.

14. The combination set forth in claim 13, and wherein said speed responsive means comprises inertia weights pivotally disposed upon the outer end of the propeller shaft for centrifugal response to the speed of said shaft, and actuating means for said jaw clutch extending outwardly through the hollow portion of the shaft into connection with said weights for control thereby.

15. In change-speed apparatus for drivingly connecting the propeller and engine crankshaft of craft propelled by an engine-driven propeller, a casing attachable to an end of the engine and including an outer end wall disposed in spaced relation from such end of the engine when the casing is so attached, a hollow propeller shaft extending inwardly of the casing through said front wall and having a propeller attaching section disposed outwardly from said wall, a ring gear in said casing coaxially with the propeller shaft, a sun gear in said casing coaxially with the propeller shaft and for coaxial driving connection with the crankshaft, planet gears mutually meshed with the sun and ring gears, a carrier for said planet gears and having a web portion upon its outer end non-rotatively connected with the propeller shaft, an overrunning brake device operable between the ring gear and a part non-rotatable relatively to the casing to hold said ring gear against backward rotation during forward rotation of the sun gear with the crankshaft wherefore the planet gears can react against said ring gear for driving the carrier and the propeller shaft connected therewith forwardly at reduced speed relatively to the crankshaft, an overrunning jaw clutch comprising toothed counterparts rotatable coaxially of the propeller shaft and disposed therein, means for respectively connecting said counterparts with the propeller shaft and with the crankshaft whereby during the aforesaid rotation of the propeller shaft at reduced speed together with the one counterpart connected therewith the other counterpart is rotated at greater speed, said other counterpart being deceleratable with the crankshaft relatively to the one counterpart and the propeller shaft incident to overrunning said overrunning brake, and speed responsive means operable upon attainment of a predetermined speed by said propeller shaft to urge said clutch counterparts into mesh and to thus effect such meshing upon deceleration of said other counterpart to synchronism with the one counterpart.

OSCAR H. BANKER.